(12) United States Patent
Asada

(10) Patent No.: US 11,644,120 B2
(45) Date of Patent: May 9, 2023

(54) FLUIDIC DEVICE WITH COVER FOR DETECTION TARGET SURFACE

(71) Applicant: TLV CO., LTD., Hyogo (JP)

(72) Inventor: Tetsuo Asada, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 702 days.

(21) Appl. No.: 15/961,049

(22) Filed: Apr. 24, 2018

(65) Prior Publication Data

US 2018/0238466 A1    Aug. 23, 2018

Related U.S. Application Data

(63) Continuation of application No. PCT/JP2016/081902, filed on Oct. 27, 2016.

(30) Foreign Application Priority Data

Oct. 30, 2015    (JP) .............................. JP2015-213613

(51) Int. Cl.
| | |
|---|---|
| *G01K 1/00* | (2006.01) |
| *F16K 37/00* | (2006.01) |
| *F16T 1/48* | (2006.01) |
| *F16K 27/02* | (2006.01) |
| *F16K 27/00* | (2006.01) |

(52) U.S. Cl.
CPC .............. *F16K 37/00* (2013.01); *F16K 27/00* (2013.01); *F16K 27/0254* (2013.01); *F16K 37/0041* (2013.01); *F16T 1/48* (2013.01)

(58) Field of Classification Search
USPC .......................................... 73/861.44–861.63
See application file for complete search history.

(56) References Cited

U.S. PATENT DOCUMENTS

| | | | |
|---|---|---|---|
| 6,352,106 B1 | 3/2002 | Hartman | |
| 8,347,823 B1* | 1/2013 | Thomas | ............... A01K 15/025 |
| | | | 119/707 |
| 2013/0192050 A1* | 8/2013 | LeMieux | ................. B21J 15/02 |
| | | | 29/524.1 |

(Continued)

FOREIGN PATENT DOCUMENTS

| | | |
|---|---|---|
| CN | 103703256 A | 4/2014 |
| JP | H01-210698 A | 8/1989 |
| JP | 2002-168371 A | 6/2002 |

(Continued)

OTHER PUBLICATIONS

An Office Action mailed by The Chilean Patent Office dated Mar. 27, 2019, which corresponds to Chilean Patent Application No. 2018-001095 and is related to U.S. Appl. No. 15/961,049 with English Translation.

(Continued)

*Primary Examiner* — Lisa M Caputo
*Assistant Examiner* — Nasir U. Ahmed
(74) *Attorney, Agent, or Firm* — Studebaker & Brackett PC

(57) ABSTRACT

A fluidic device includes a casing in which a fluid passage is disposed and which has an outer surface including a detection target surface (bottom surface) that is to contact a detection part of a sensor so that at least one of a temperature and a vibration of the fluidic device is detected; and a plug detachably disposed on the casing and configured to cover the detection target surface (bottom surface).

1 Claim, 3 Drawing Sheets

(56) References Cited

U.S. PATENT DOCUMENTS

2014/0124067 A1 5/2014 Feser et al.
2014/0269829 A1* 9/2014 Bronczyk ................ G01K 1/08
374/152

FOREIGN PATENT DOCUMENTS

JP 2010-031920 A 2/2010
JP 2015-145789 A 8/2015

OTHER PUBLICATIONS

An Office Action mailed by the Columbian Patent Office dated Apr. 12, 2019, which corresponds to Columbian Patent Application No. NC2018/0004415 and is related to U.S. Appl. No. 15/961,049 with English Translation.
International Search Report issued in PCT/JP2016/081902; dated Jan. 24, 2017.
The extended European search report issued by the European Patent Office dated Oct. 10, 2018, which corresponds to European Patent Application No. 16859905.8-1015 and is related to U.S. Appl. No. 15/961,049.
An Office Action mailed by The State Intellectual Property Office of the People's Republic of China dated Jan. 30, 2019, which corresponds to Chinese Patent Application No. 201680061696.6 and is related to U.S. Appl. No. 15/961,049.
An Office Action mailed by the Australian Patent Office dated Dec. 19, 2018, which corresponds to Australian Patent Application No. 2016345837 and is related to U.S. Appl. No. 15/961,049.
An Office Action mailed by The Korean Patent Office dated Jul. 16, 2019, which corresponds to Korean Patent Application No. 10-2018-7013833 and is related to U.S. Appl. No. 15/961,049; with English language translation.
An Office Action mailed by the Mexican Patent Office dated May 7, 2019, which corresponds to Mexican Patent Application No. MX/a/2018/005161 and is related to U.S. Appl. No. 15/961,049; with English language translation.

* cited by examiner

FLUIDIC DEVICE WITH COVER FOR DETECTION TARGET SURFACE

CROSS-REFERENCE TO RELATED APPLICATION

This is a continuation of PCT International Application PCT/JP2016/081902 filed on Oct. 27, 2016, which claims priority to Japanese Patent Application No. 2015-213613 filed on Oct. 30, 2015. The disclosures of these applications including the specifications, the drawings, and the claims are hereby incorporated by reference in their entirety.

FIELD

The present application relates to a fluidic device including a casing whose outer surface includes a detection target surface with which a detection part of a sensor is to be brought into contact.

BACKGROUND

As described in, for example, Patent Document 1, a known fluidic device (valve) includes a casing having a detection target surface (coupling base) with which a sensor is to be brought into contact. In this fluidic device, the outer surface of the casing has the coupling base for the sensor. The sensor is attached to the coupling base while being in contact with the surface of the coupling base (detection target surface). The thus-attached sensor detects a temperature and vibrations of the fluidic device to determine an operating state of the fluidic device.

SUMMARY

The fluidic device described above is generally placed in a predetermined place before the sensor is attached to the coupling base. That is, the detection target surface of the coupling base is exposed to the environment for a long period until the sensor is attached thereto. Accordingly, dirt and dust are accumulated on the detection target surface, and when the sensor is attached to and contacts the detection target surface, the detection accuracy of the sensor might be impaired.

The technique disclosed in the present application has been made in view of the foregoing circumstances, and has an object of preventing a decrease in the detection accuracy of the sensor due to accumulation of dirt and dust on the detection target surface of the casing.

To achieve the object, a fluidic device according to the present application is configured to prevent accumulation of dirt and dust on a detection target surface of a casing.

Specifically, the fluidic device according to the present application includes a casing and a cover member. A fluid passage is disposed in the casing, and the casing has an outer surface including a detection target surface that is to contact a detection part of a sensor so that at least one of a temperature and a vibration of the fluidic device is detected. The cover member is detachably disposed on the casing and is configured to cover the detection target surface.

As described above, in the fluidic device according to the present application, the detection part of the sensor is brought into contact with the detection target surface of the casing so that a temperature and a vibration of the casing are thereby detected. In the fluidic device according to the present application, the cover member covering the detection target surface is detachably provided to the casing. Thus, the cover member is always attached to the casing except for a period in which the sensor is in contact with the detection target surface. Accordingly, the cover member can prevent accumulation of dirt and dust on the detection target surface. As a result, it is possible to prevent degradation of a detection accuracy of the sensor due to accumulation of dirt and dust on the detection target surface.

DESCRIPTION OF EMBODIMENT

An embodiment of the present application will be described hereinafter with reference to the drawings. The following embodiment is merely a preferred example in nature, and is not intended to limit techniques disclosed in this application, applications, and use of the application.

A fluidic device 10 according to this embodiment is an orifice-type drain discharge mechanism, is disposed in, for example, a steam system, and discharges drain (condensate) at a high temperature and a high pressure generated by condensation of steam. The orifice-type drain discharge mechanism does not include a valve body for opening and closing an orifice, and the orifice is always open.

Overall Configuration

Figure 1:
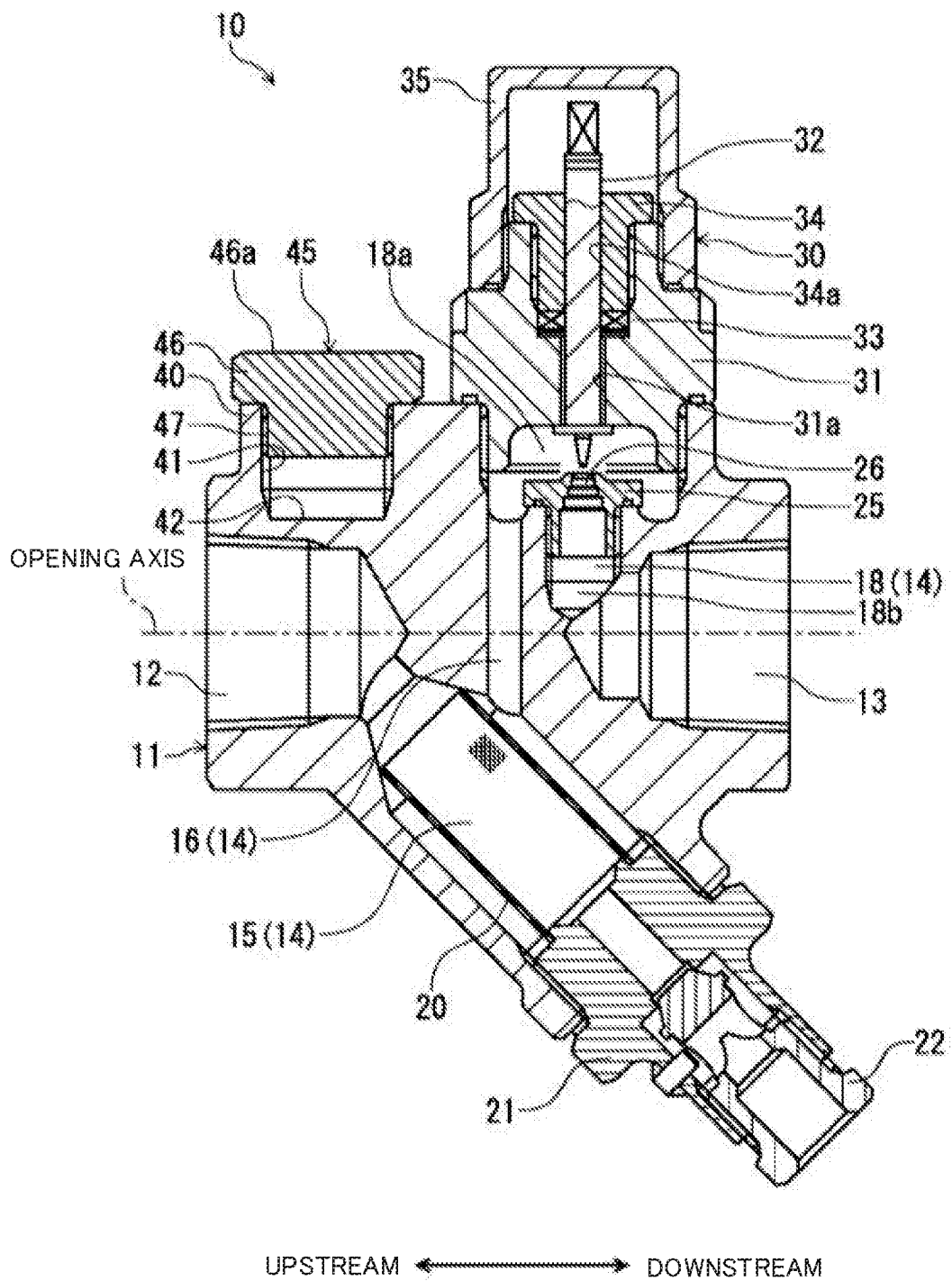
FIG. 1 is a cross-sectional view illustrating a schematic configuration of a fluidic device according to an embodiment.

As illustrated in FIG. 1, the fluidic device 10 according to this embodiment includes a casing 11, a screen 20, an orifice member 25, and a cleaning mechanism 30.

The casing 11 has a substantially Y shape, and drain flows inside the casing 11. The casing 11 has an inlet 12 and an outlet 13 for drain, and a fluid passage 14 connecting the inlet 12 and the outlet 13 to each other. The inlet 12 and the outlet 13 are opposed to each other in a flow direction, and the inlet 12 and the outlet 13 are coaxially disposed (i.e., have a common opening axis). The fluid passage 14 includes a blow passage 15, a connection passage 16, and an orifice passage 18.

The blow passage 15 tilts relative to the opening axes, and is connected to the inlet 12. The connection passage 16 is a passage extending in a radial direction about the opening axis (i.e., a radial direction of a circle about the opening axis), and connects the blow passage 15 and the orifice passage 18 to each other (i.e., allows the blow passage 15 and the orifice passage 18 to communicate with each other). The orifice passage 18 is a passage in which the orifice member 25 described later is disposed. The orifice passage 18 is a passage disposed downstream of the connection passage 16 and extending in a radial direction from the opening axis. The orifice passage 18 has an outer end 18a (upper end in FIG. 1) connected to the connection passage 16 and an inner end 18b (lower end in FIG. 1) connected to the outlet 13. That is, the orifice passage 18 extends from the outer side toward the inner side with respect to the opening axis, the outer end 18a communicates with the inlet 12, and the inner end 18b communicates with the outlet 13.

The screen 20 is disposed inside the blow passage 15. The screen 20 has a cylindrical shape extending axially in the blow passage 15, and has one end open toward the inlet 12. A screen holder 21 for holding the screen 20 is screwed to an opening end of the blow passage 15 in the casing 11. The screen 20 constitutes a filter member for capturing foreign matter included in drain that has flowed into the blow passage 15 from the inlet 12. The screen holder 21 is provided with a blow down valve 22. The blow down valve 22 is configured to be made open to eject foreign matter captured by the screen 20 outward together with a flow of drain.

The orifice member 25 is disposed in a portion of the orifice passage 18 as described above, and constitutes a partition that partitions the orifice passage 18 into upstream and downstream portions in the flow direction. The orifice member 25 is screwed and attached to a passage wall of the orifice passage 18 in the flow direction. An orifice 26 (small hole) is formed in a center portion of the orifice member 25 to penetrate the orifice member 25 in the flow direction. In this embodiment, the opening diameter (opening area) of the orifice 26 increases stepwise toward the downstream side. The opening diameter of the orifice 26 may increase continuously toward the downstream side.

In the fluidic device 10, high-temperature high-pressure drain flows to the screen 20 from the inlet 12, passes through the screen 20, and flows into the orifice passage 18 through the connection passage 16. While drain passes through the screen 20, foreign matter included in the drain is captured by the screen 20. Drain that has flowed into the orifice passage 18 passes through the orifice 26 and is discharged to the outside from the outlet 13. While drain passes through the orifice 26, the flow rate of the drain is restricted to a flow rate in accordance with the opening diameter (opening area) of the orifice 26.

A trace amount of foreign matter not captured by the screen 20 might pass through the screen 20 to be accumulated in the orifice 26 to cause clogging. The cleaning mechanism 30 according to this embodiment is used for removing foreign matter stuck in (attached to) the orifice 26. The cleaning mechanism 30 is attached to the outer wall of the casing 11 on which the outer end 18a of the orifice passage 18 is located, that is, the outer wall of the casing 11 facing the orifice member 25. The cleaning mechanism 30 includes a holding member 31, a cleaning member 32, and a cap 35.

The holding member 31 is used for holding the cleaning member 32, and is screwed to the outer wall of the casing 11. The cleaning member 32 has a circular rod-shaped cross section, and is held while being screwed to a screw hole 31a of the holding member 31. The cleaning member 32 is disposed at a position facing the orifice 26 and is coaxially with the orifice 26 (orifice member 25). The cleaning member 32 has a front end having a tapered conical shape. A gasket 33 for sealing a gap between the screw hole 31a and the cleaning member 32 is fixed to the holding member 31 with a retaining member 34. The retaining member 34 has an insertion hole 34a into which the cleaning member 32 is slidably inserted. The cap 35 that covers an upper end of the cleaning member 32 and the retaining member 34 is screwed and attached to the holding member 31.

The cleaning mechanism 30 is configured in such a manner that rotation of the cleaning member 32 moves the cleaning member 32 into and out of the orifice 26 from the upstream side to remove foreign matter in the orifice 26. Specifically, the cleaning member 32 is rotated to be thereby moved (displaced) in the top-bottom direction in FIG. 1. Accordingly, the cleaning member 32 moves forward and backward from the outer end 18a of the orifice passage 18 toward the orifice 26. When the cleaning member 32 moves forward so that the front end of the cleaning member 32 enters the orifice 26, foreign matter stuck in the orifice 26 is pushed by the cleaning member 32 to the downstream side and is removed. The foreign matter pushed downward is ejected from the outlet 13 together with drain.

Configuration of Sensor Attachment Part

Figure 2:
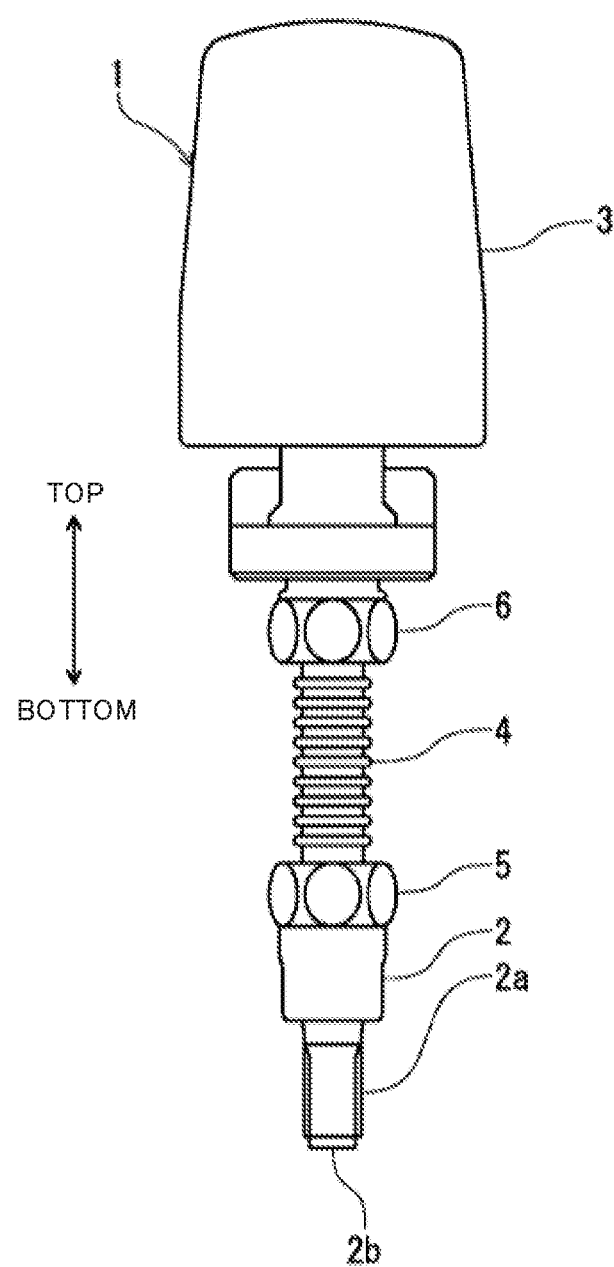
FIG. 2 is a front view illustrating a schematic configuration of a sensor device according to the embodiment.

As illustrated in FIG. 1, the fluidic device 10 according to this embodiment includes a sensor attachment part 40 disposed in the casing 11. The sensor attachment part 40 is a part to which the sensor device 1 illustrated in FIG. 2 as an example is attached. The sensor device 1 includes a sensor body 2, a communication device 3, and a connection shaft 4. The connection shaft 4 is a hollow shaft, and has both ends coupled to the sensor body 2 and the communication device 3 with nuts 5 and 6. The sensor body 2 includes an external thread 2a, and a front end 2b of the external thread 2a constitutes a detection part. The front end 2b of the sensor body 2 contacts a measurement object to thereby detect a temperature and vibrations of the measurement object. Although not shown, the communication device 3 incorporates a signal processing circuit and a transmitter, acquires a signal concerning vibrations and a temperature of the measurement object detected by the sensor body 2, and transmits the signal to the outside. The sensor body 2 corresponds to a sensor recited in claims of the present application.

The sensor attachment part 40 is disposed near (around) the inlet 12 of the casing 11. The sensor attachment part 40 includes a screw hole 41 and a plug 45. The screw hole 41 is a bottomed internal screw hole formed in the outer surface of the casing 11. That is, the screw hole 41 is not a through hole, and does not communicate with any space in the casing 11. A bottom surface 42 of the screw hole 41 constitutes a detection target surface. The detection target surface is a surface with which the front end 2b of the sensor body 2 is brought into contact and whose temperature, for example, is detected. That is, the outer surface of the casing 11 includes a detection target surface.

The plug 45 is detachably attached to the casing 11, covers the bottom surface 42 (detection target surface), and corresponds to a cover member recited in claims of the present application. Specifically, the plug 45 includes a flat head 46 and an external thread 47 continuously formed in the lower surface of the head 46. An upper surface 46a of the head 46 is flat. The plug 45 is attached to the casing 11 with the external thread 47 screwed to the screw hole 41. Once the plug 45 is thus attached to the casing 11, the screw hole 41 is closed with the plug 45. That is, the bottom surface 42 (detection target surface) of the screw hole 41 is covered (protected) with the plug 45. The external thread 47 of the plug 45 is shorter than the depth of the screw hole 41. That is, in the state where the plug 45 is screwed to the screw hole 41, the external thread 47 is not in contact with the bottom surface 42 (detection target surface).

Figure 3:
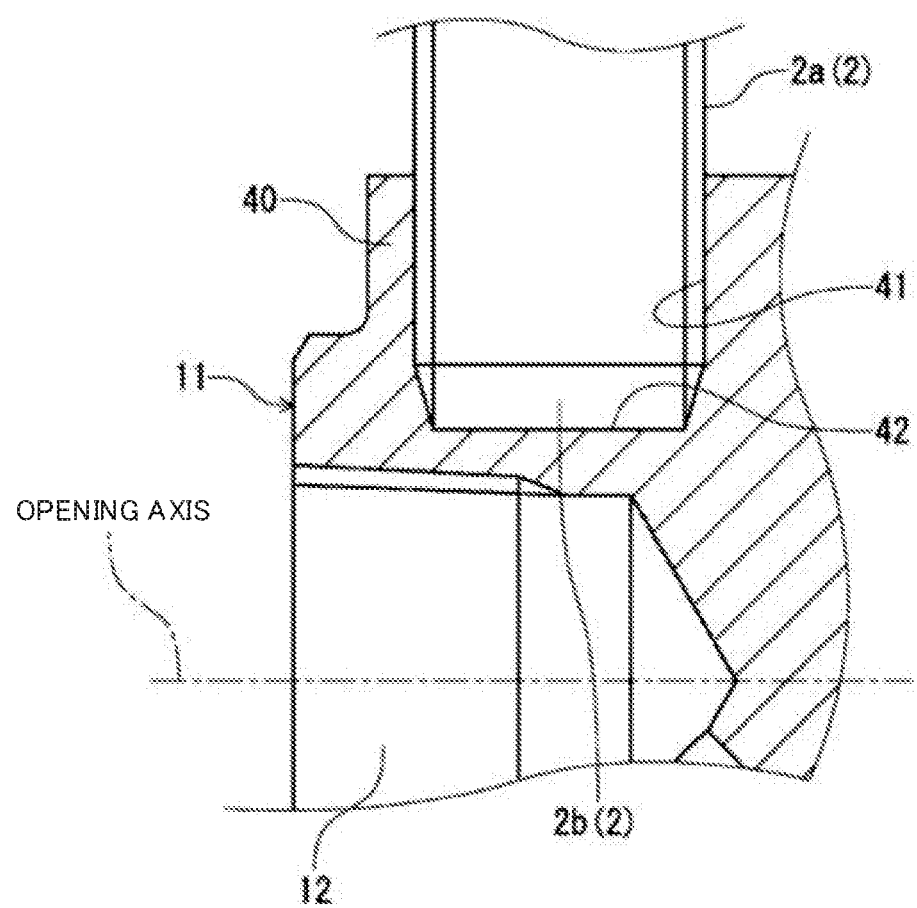
FIG. 3 is an enlarged cross-sectional view illustrating a main portion of the fluidic device to which the sensor device is attached.

The screw hole 41 is a sensor attachment hole to which the sensor device 1 is attached in the state where the plug 45 is detached. Specifically, as illustrated in FIG. 3, the external thread 2a of the sensor body 2 is screwed to the screw hole 41 from which the plug 45 is detached so that the sensor device 1 is thereby fixed to the casing 11. In this state, the front end 2b of the external thread 2a of the sensor body 2 is in contact with the bottom surface 42 (detection target surface) of the screw hole 41. Accordingly, a temperature and vibrations of the bottom surface 42 (detection target surface) are detected by the sensor body 2.

As described above, in the fluidic device 10 according to the embodiment described above, the cover member (plug 45) covering the detection target surface (bottom surface 42 of the screw hole 41) is detachably disposed in the casing 11. Accordingly, the cover member is attached to the casing 11 except for a period in which the sensor body 2 is in contact with the detection target surface so that the cover member can prevent accumulation of dirt and dust on the detection target surface. As a result, it is possible to prevent a decrease in detection accuracy of the sensor body 2 due to accumulation of dirt and dust on the detection target surface.

In the fluidic device 10 according to this embodiment, the screw hole 41 having the bottom surface 42 serving as the detection target surface is disposed on the outer surface of the casing 11, and the cover member (plug 45) includes the external thread 47 to be screwed to the screw hole 41. Accordingly, the detection target surface can be covered (protected) with a simple configuration in which the cover member (plug 45) is screwed to the screw hole 41. In addition, in attaching the sensor body 2, the cover member can be easily detached.

Furthermore, in the fluidic device 10 according to the embodiment described above, the screw hole 41 is the sensor attachment hole to which the sensor body 2 is screwed and fixed, and thus, the sensor body 2 can be easily attached to the casing 11.

In the embodiment described above, the plug 45 of a screw type is used as the cover member, and thus, a general-purpose member can be used.

In the fluidic device 10 according to the embodiment described above, the screw hole 41 is the sensor attachment hole (hole for attaching the sensor). Alternatively, the screw hole 41 may be a hole for inserting the sensor therein. That is, the above embodiment is directed to the fixed-type sensor, but the fluidic device 10 according to the present application can also be used for a hand-held sensor that is held by an operator with hand to be pushed against a measurement object for detection. In this case, the operator holds the sensor with hand and inserts the sensor into the screw hole 41 to bring the front end of the sensor into contact with the bottom surface 42 (detection target surface) so that a temperature, for example, can be detected. The screw hole 41 is closed with the plug 45 in a period except for a detection operation by the operator.

In the embodiment described above, the sensor body 2 may, of course, detect only one of a temperature and a vibration.

In the fluidic device 10 according to the embodiment described above, the screw hole 41 may be replaced by a bottomed hole including no screw part. In this case, the bottom surface of the hold constitutes a detection target surface, in a manner similar to the above embodiment. The cover member may be a fitting-type member that is fitted in a hole to close the hole, instead of the screw-type plug 45 described above. In this case, the bottom surface (detection target surface) of the hold is also covered (protected) with the fitting-type member.

The above embodiment is directed to the orifice-type drain discharge mechanism as an example of a fluidic device. The technique disclosed in the present application is also applicable to valves such as a steam trap including a valve body and fluidic device such as a screen.

The technique disclosed in the present application is useful for a fluidic device including a casing having a detection target surface with which a detection part of a sensor is to be brought into contact.

What is claimed is:

1. A fluidic device comprising:
a casing in which a fluid passage is disposed and which has an outer surface including a detection target surface separate from the fluid passage that is to contact a detection part of a sensor detachably disposed on the casing so that at least one of a temperature and a vibration of the fluidic device is detected from the outer surface of the casing; and
a cover member detachably disposed on the casing and configured to cover the detection target surface when the sensor is detached from the casing;
wherein the outer surface of the casing has a bottomed hole having a bottom surface, the bottom surface constituting the detection target surface;
wherein the bottomed hole of the outer surface of the casing comprises a screw hole;
wherein the cover member is a plug having an external thread that is screwed to the screw hole;
wherein the external thread of the plug is shorter than a depth of the screw hole, such that when the plug is screwed into the screw hole, the external thread is not in contact with the detection target surface;
wherein the sensor has an external thread having a front end constituting the detection part; and
wherein the screw hole of the casing is a sensor attachment hole to which the external thread of the sensor is screwed so that the front end of the external thread of the sensor contacts the bottom surface of the screw hole in a state where the cover member is detached.

* * * * *